United States Patent
Smith (10) Patent No.: US 10,200,119 B2
(45) Date of Patent: Feb. 5, 2019

(54) OPTICAL SPLITTER ASSEMBLY HAVING TUNED OUTPUT PIGTAILS

(71) Applicant: CommScope Technologies LLC, Hickory, NC (US)

(72) Inventor: Trevor D. Smith, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/054,689

(22) Filed: Feb. 26, 2016

(65) Prior Publication Data

US 2016/0344474 A1 Nov. 24, 2016

Related U.S. Application Data

(63) Continuation of application No. 12/429,299, filed on Apr. 24, 2009, now Pat. No. 9,276,673.

(60) Provisional application No. 61/047,486, filed on Apr. 24, 2008.

(51) Int. Cl.
*H04B 10/27* (2013.01)
*H04B 10/073* (2013.01)
*H04B 10/077* (2013.01)

(52) U.S. Cl.
CPC ....... *H04B 10/0773* (2013.01); *H04B 10/073* (2013.01); *H04B 10/27* (2013.01)

(58) Field of Classification Search
CPC ... H04B 10/073; H04B 10/0773; H04B 10/27
USPC ............... 398/16, 9, 10, 20, 21, 33
See application file for complete search history.

(56) References Cited

U.S. PATENT DOCUMENTS

| | | | |
|---|---|---|---|
| 4,877,306 A | 10/1989 | Kar | |
| 5,241,613 A | 8/1993 | Li et al. | |
| 5,745,619 A | 4/1998 | Li et al. | |
| 6,115,163 A * | 9/2000 | Nobuhara | H04B 10/695 398/1 |
| 6,456,370 B1 | 9/2002 | Ingles, Jr. | |
| 6,498,888 B1 | 12/2002 | Chenard | |
| 6,650,840 B2 | 11/2003 | Feldman | |
| 6,715,933 B1 | 4/2004 | Zimmer et al. | |
| 6,766,115 B1 | 7/2004 | Sorin et al. | |
| 6,941,576 B2 | 9/2005 | Amit | |

(Continued)

FOREIGN PATENT DOCUMENTS

JP 2011-69721 4/2011
WO WO 2014/063034 4/2014

OTHER PUBLICATIONS

Ricci et al; Quality Control of the CMS Tracker and ECAL Installed Opitcal cabling; 2007; CERN—European Organization for Nuclear reasearch; pp. 125-129.*

(Continued)

*Primary Examiner* — Amritbir K Sandhu
(74) *Attorney, Agent, or Firm* — Merchant & Gould P.C.

(57) ABSTRACT

The present disclosure relates to a method for testing a fiber optic network including a fiber distribution hub. The method includes providing a test splitter within the fiber distribution hub to provide optical connectivity between an F1 fiber and at least a portion of an F2 fiber network. The method also includes testing sending a test signal from the F1 fiber through the test splitter to the F2 fiber network, and replacing the test splitter after testing has been completed.

5 Claims, 5 Drawing Sheets

(56) References Cited

U.S. PATENT DOCUMENTS

| | | | |
|---|---|---|---|
| 7,088,899 B2* | 8/2006 | Reagan | G02B 6/4452 385/135 |
| 7,218,827 B2 | 5/2007 | Vongseng et al. | |
| 7,329,049 B2 | 2/2008 | Meek et al. | |
| 7,636,507 B2 | 12/2009 | Lu et al. | |
| 7,660,530 B2 | 2/2010 | Mino | |
| 7,715,718 B2 | 5/2010 | Smith et al. | |
| 7,756,418 B2 | 7/2010 | Ofalt et al. | |
| 7,809,235 B2 | 10/2010 | Reagan et al. | |
| 7,956,992 B2 | 6/2011 | Watte et al. | |
| 8,374,476 B2 | 2/2013 | Reagan et al. | |
| 8,482,725 B2 | 7/2013 | Perron et al. | |
| 8,588,571 B1 | 11/2013 | Lam et al. | |
| 8,670,661 B2 | 3/2014 | Haran | |
| 8,687,957 B2 | 4/2014 | Perron | |
| 9,016,953 B2 | 4/2015 | Ott et al. | |
| 9,276,673 B2* | 3/2016 | Smith | H04B 10/073 |
| 9,608,720 B2* | 3/2017 | Smith | H04B 10/071 |
| 2002/0015200 A1* | 2/2002 | Jennings | H04B 10/077 398/79 |
| 2002/0140926 A1 | 10/2002 | Ingles, Jr. | |
| 2003/0210908 A1* | 11/2003 | Levy | H04B 10/07 398/33 |
| 2004/0126110 A1 | 7/2004 | Matz et al. | |
| 2004/0208503 A1 | 10/2004 | Shieh | |
| 2005/0036786 A1 | 2/2005 | Ramachandran et al. | |
| 2005/0135735 A1 | 6/2005 | Deutsch et al. | |
| 2005/0207705 A1* | 9/2005 | Laurent-Lund | G02B 6/125 385/45 |
| 2005/0207710 A1 | 9/2005 | Tanaka et al. | |
| 2006/0007426 A1* | 1/2006 | Weller | H04B 10/0771 356/73.1 |
| 2006/0153517 A1* | 7/2006 | Reagan | G02B 6/3897 385/135 |
| 2006/0198634 A1* | 9/2006 | Ofalt | H04B 10/077 398/16 |
| 2006/0285807 A1 | 12/2006 | Lu et al. | |
| 2007/0036507 A1 | 2/2007 | Allen et al. | |
| 2007/0147741 A1 | 6/2007 | Meek et al. | |
| 2008/0019646 A1 | 1/2008 | deJong | |
| 2008/0304823 A1 | 12/2008 | Mahony et al. | |
| 2009/0028550 A1 | 1/2009 | Zhang et al. | |
| 2009/0047013 A1 | 2/2009 | Effenberger | |
| 2009/0060495 A1 | 3/2009 | Wurst et al. | |
| 2009/0067832 A1 | 3/2009 | DeLew et al. | |
| 2009/0115999 A1* | 5/2009 | Watte | G01M 11/3154 356/73.1 |
| 2009/0129773 A1 | 5/2009 | Oron | |
| 2009/0268197 A1* | 10/2009 | Perron | G01M 11/3118 356/73.1 |
| 2009/0269054 A1* | 10/2009 | Smith | H04B 10/073 398/25 |
| 2010/0014854 A1* | 1/2010 | Healey | H04B 10/077 398/16 |
| 2010/0183276 A1 | 7/2010 | Smith | |
| 2010/0226615 A1 | 9/2010 | Reagan et al. | |
| 2010/0226654 A1* | 9/2010 | Smith | H04B 10/25754 398/116 |
| 2011/0019966 A1 | 1/2011 | Reagan et al. | |
| 2011/0217015 A1* | 9/2011 | Smith | G02B 6/46 385/135 |
| 2011/0293277 A1 | 12/2011 | Bradea et al. | |
| 2012/0045205 A1* | 2/2012 | Perron | H04B 10/0795 398/48 |
| 2013/0004130 A1 | 1/2013 | Barnes et al. | |
| 2014/0003772 A1* | 1/2014 | Burkett | G02B 6/3849 385/78 |
| 2014/0050451 A1 | 2/2014 | Reagan et al. | |
| 2014/0111795 A1 | 4/2014 | Barnhart et al. | |
| 2014/0193147 A1* | 7/2014 | Smith | H04B 10/071 398/16 |
| 2015/0093091 A1 | 4/2015 | Reagan et al. | |

OTHER PUBLICATIONS

International Search Report and Written Opinion for Application No. PCT/US2013/066028 dated Jan. 28, 2014.

* cited by examiner

OPTICAL SPLITTER ASSEMBLY HAVING TUNED OUTPUT PIGTAILS

CROSS-REFERENCE TO RELATED APPLICATIONS

This application is a continuation of application Ser. No. 12/429,299, filed Apr. 24, 2009, now U.S. Pat. No. 9,276,673, which claims the benefit of provisional application Ser. No. 61/047,486, filed Apr. 24, 2008, which applications are incorporated herein by reference, in their entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with the subscriber's devices. However, to the extent that an end user may have devices that are compatible with optical signals, conversion of the optical signal to an electrical signal may not be necessary.

FTTP networks include active optical networks and passive optical networks. Active optical networks use electrically powered equipment (e.g., a switch, router, multiplexer or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

Once a fiber optic network has initially been installed, it is often desirable to test the performance of various fiber optic lines/circuits in the network to make sure the lines/circuits satisfy certain minimum performance requirements. Testing systems and methods that reduce labor and equipment cost are needed.

SUMMARY

Features of the present disclosure relate to methods and systems for efficiently testing fiber optic communications networks.

These and other features and advantages will be apparent from a reading of the following detailed description and a review of the associated drawings. It is to be understood that both the forgoing general description and the following detailed description are explanatory only and are not restrictive of the broad aspects of the disclosure.

DETAILED DESCRIPTION

Figure 1:
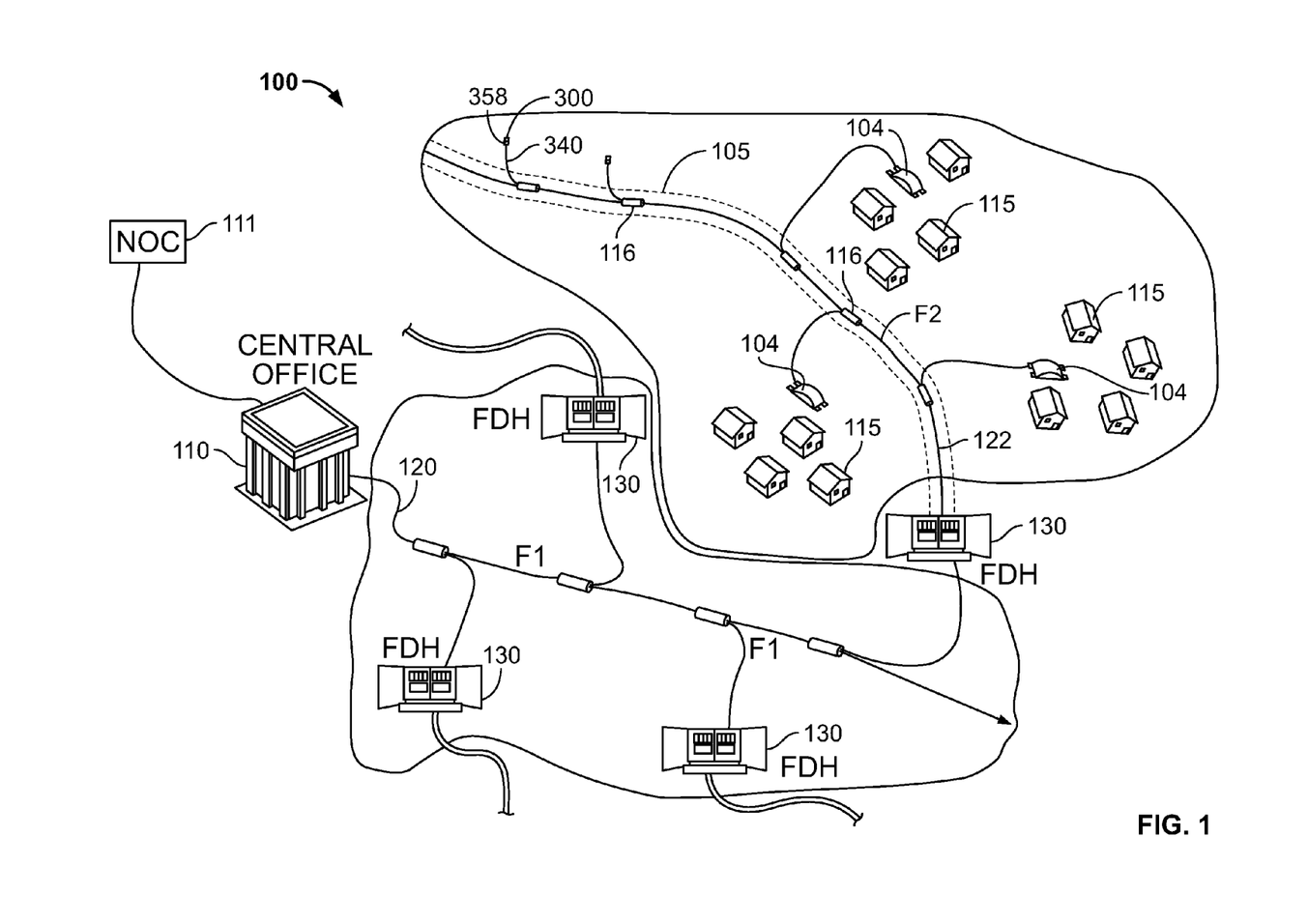
FIG. 1 shows a passive fiber optic network after initial deployment but prior to installation of drop cables.

FIG. 1 illustrates an exemplary passive optical network 100. As shown in FIG. 1, the network 100 is adapted to interconnect a central office 110 to a number of end subscribers 115 (also called end users 115 herein). The central office 110 may additionally connect to a larger network such as the Internet (not shown) and a public switched telephone network (PSTN). The various lines of the network can be aerial or housed within underground conduits (e.g., see conduit 105). A Network Operation Center (NOC) 111 is shown interfacing with the central office 110.

In general, the network 100 includes feeder distribution cables 120 routed from the central office 110. The distribution cables often include a main cable or trunk, and a plurality of branch cables that branch from the main cable. The portion of network 100 that is closest to central office 110 is generally referred to as the F1 region. The F1 portion of the network may include a feeder cable (i.e., an F1 distribution cable) having on the order of 12 to 48 fibers; however, alternative implementations may include fewer or more fibers. The network 100 also has an F2 portion that includes cables and components located in closer proximity to the subscriber/end users 115.

The network 100 also may include fiber distribution hubs (FDHs) 130 that receive branch fibers of the distribution cable 120 and that output one or more F2 distribution cables 122. In general, an FDH 130 is an equipment enclosure that may include a plurality of optical splitters (e.g., 1-to-8 splitters, 1-to-16 splitters, or 1-to-32 splitters) for splitting the incoming feeder fibers into a number (e.g., 216, 432, etc.) of output distribution fibers corresponding to the F2 distribution cables 122. The F2 distribution cables are routed from the FDH 130 to locations in close proximity to the end users 115.

The network 100 typically includes a plurality of breakout locations 116 at which branch cables (e.g., drop cables, stub cables, etc.) are separated out from and optically coupled to trunks of the distribution cables 122. Breakout locations 116 also can be referred to as tap locations or branch locations and branch cables also can be referred to as breakout cables or tethers. At a breakout location, fibers of the trunk of the distribution cable can be broken out and connectorized to form a connectorized tether. In other embodiments, fibers of the trunk can be broken out and spliced to a length of optical fiber having a connectorized free end so as to form a connectorized tether.

Stub cables are typically branch cables that are routed from breakout locations 116 to intermediate access locations, such as a pedestals, drop terminals 104 or hubs. Intermediate access locations can provide connector interfaces located between breakout locations 116 and the subscriber locations 115. A drop cable is a cable that typically forms the last leg to a subscriber location 115. For example, drop cables can be routed from intermediate access locations to subscriber locations 115. Drop cables also can be routed directly from breakout locations 116 to subscriber locations 115, thereby bypassing any intermediate access locations. FIG. 1 shows the network after installation of the distribution cables and drop terminals, but before installation of drop cables. Upon completion of the network, drop cables will typically be installed to form the final legs between the subscribers 115 and the intermediate locations (e.g., drop terminals 104) or between the subscribers 115 and the break out locations 116.

In certain embodiments, factory integrated terminations may be used at the F1 and/or the F2 region to provide environmentally sound and cost effective splicing protection. Factory integrated terminations refer to the use of factory integrated access (tap) points at specified locations, such as at breakout locations 116, in the network 100 instead of field installed splices. These access points 116 may be connectorized to provide a simple plug and play approach in the distribution portion of the network 100 when connecting subscribers 115 to the network 100. For example, implementations consistent with the principles of the disclosure may include tethers terminated by rugged outside plant connectors that can include single or multi-port connectors. Examples of connectors and/or receptacles that may be adapted for use on the distal end of a tether are further described in U.S. Pat. No. 7,264,402 and U.S. Patent Application Ser. No. 61/029,524, that are hereby incorporated by reference in their entireties.

Figure 2:
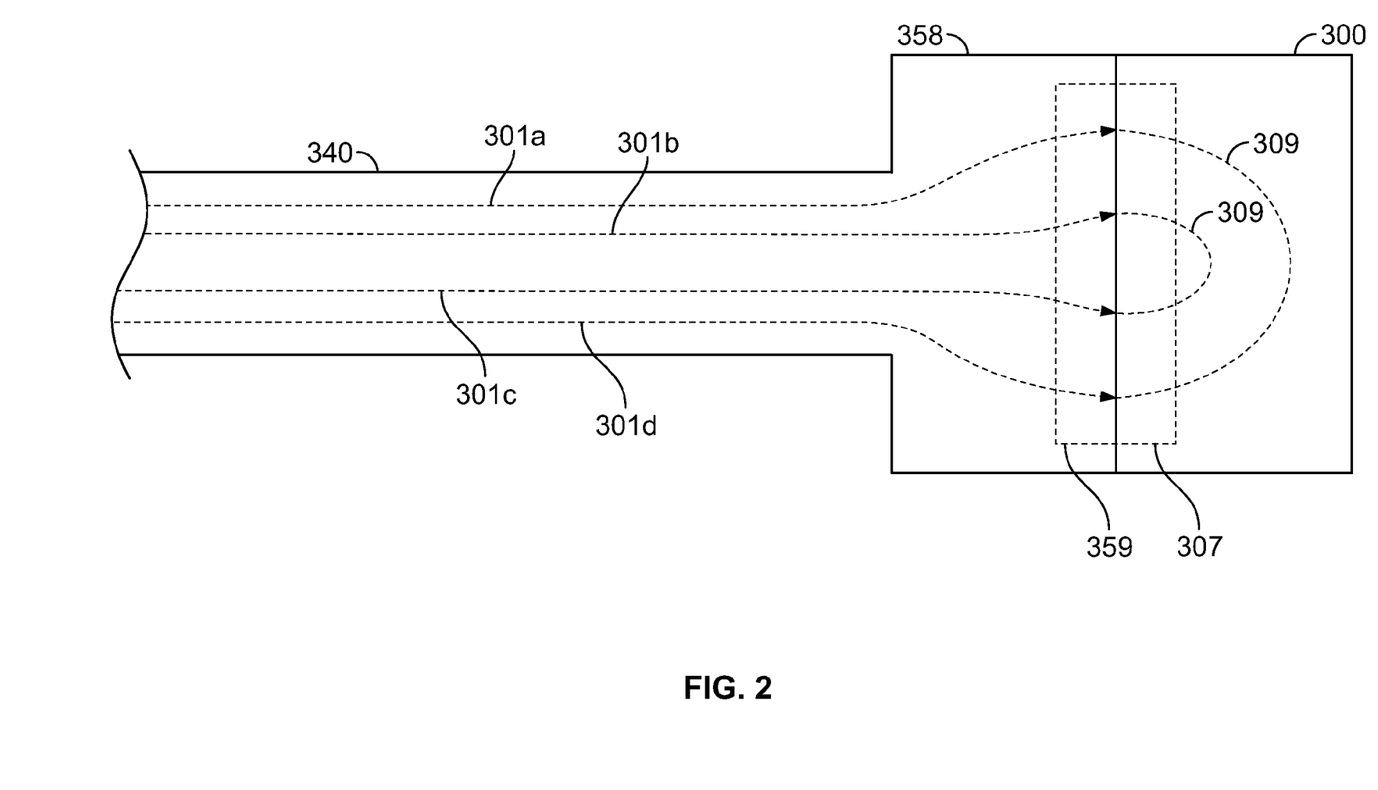
FIG. 2 is a schematic depiction of a fiber optic tether having a multi-fiber connector connected to a loop-back plug.
Figure 3:
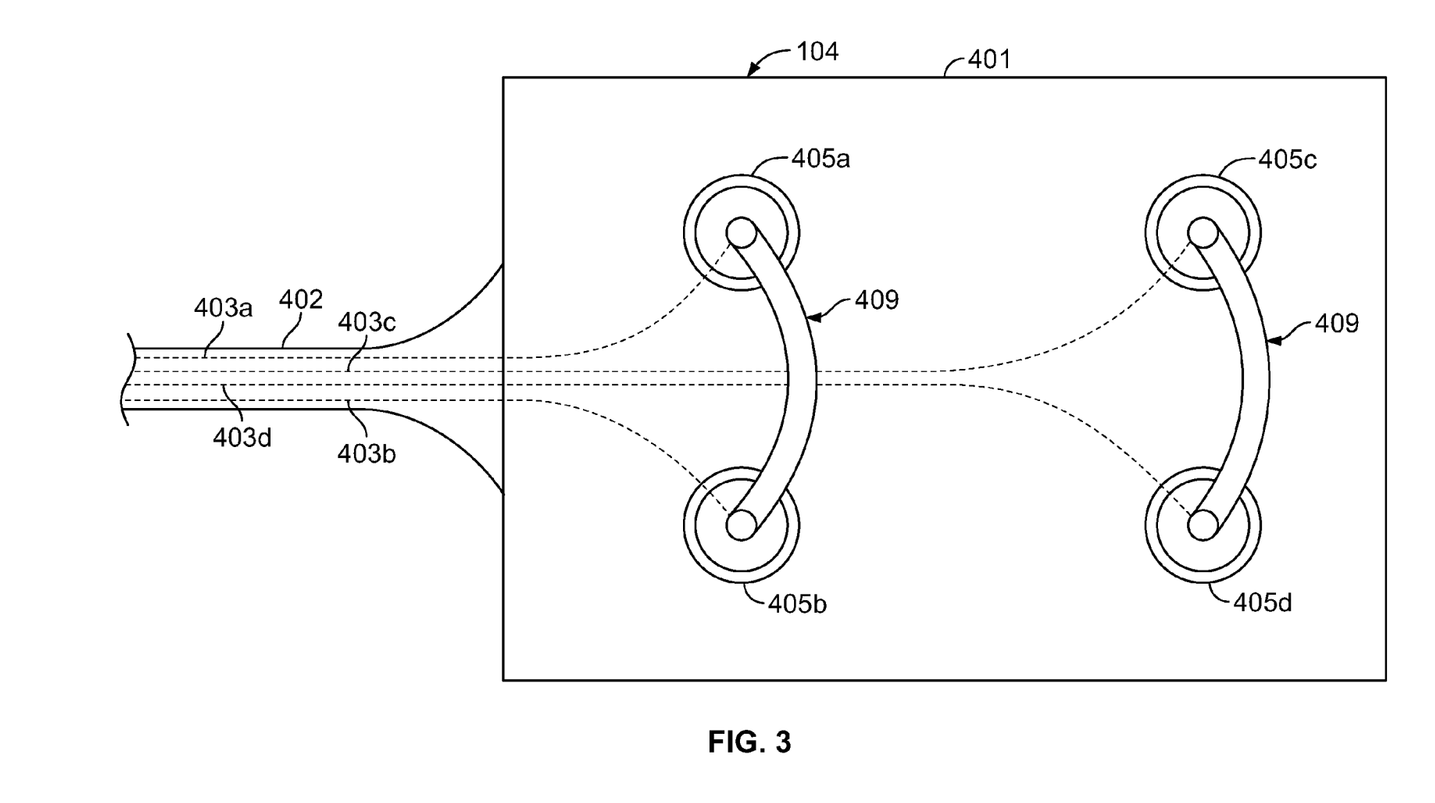
FIG. 3 is a schematic depiction of a drop terminal having a loop-back arrangement.

In certain embodiments, loop back devices/arrangements can be used to facilitate testing the transmission capabilities of the network. FIG. 2 illustrates a loop back plug 300 for use in testing the network of FIG. 1. The distribution cable F2 of the network of FIG. 1 includes a trunk cable and a plurality of tethers 340 that branch from the trunk cable at factory installed breakout locations. At least some of the tethers 340 are pre-connectorized with connectors 358. Each of the connectors is adapted to interconnect with a corresponding loop back plug 300 to facilitate testing of the network. The loop back plug 300 may be configured to couple a first fiber in the tether 340 to a second fiber in the tether 340. For example, the loop back plug 300 is shown optically coupling fiber 301a of the tether to fiber 301b of the tether. The loop back plug 300 also couples fiber 301c of the tether to fiber 301d of the tether. The loop back plug 300 can include a multi-termination (MT) ferrule 307 defining multiple fiber openings or bores receiving fibers that define fiber loops 309. The bores of the ferrule 307 align with corresponding bores defined in a ferrule 359 of the connector 358 such that the ends of the fiber loops 309 align with the ends of the fibers 301a-301d. When the connectorized tether 340 is ready to be brought into service, the loop back plug 300 can be removed from the connector 358 and a connector corresponding to a branch cable such as a drop cable or stub cable can be plugged into the connector 358. While 4 fibers are shown in the arrangement of FIG. 2, it will be appreciated that any number of fibers may be used. For example, in certain embodiments, systems having tethers, connectors and loop back plugs suitable for accommodating 12 fibers can be used. FIG. 3 shows another loop back arrangement suitable for facilitating testing of the network of FIG. 1. The loop back arrangement is shown used in combination with a drop terminal 104. The drop terminal 104 includes a housing 401 that receives an end of a stub cable 402 containing four fibers 403a-403d. The fibers 403a-403d are each optically connected to an interior fiber optic connector located within the housing 401. For example, the interior fiber optic connectors can be mounted directly on the fibers 403a-403d, or can be mounted at the ends of pigtails that are spliced to the optical fibers 403a-403d. The interior fiber optic connecters are plugged into inner ports of fiber optic adapters 405a-405d that are mounted to an exterior wall of the housing 401. The fiber optic adapters 405a-405d include outer ports that are accessible from outside the housing 401. Loop back connector arrangements 409 optically interconnect fiber optic adapters 405a to fiber optic adapter 405b; and also optically connect fiber optic adapter 405c to fiber optic adapter 405d. In this way, the loop back connector arrangements 409 provide optical links/paths that optically connect optical fiber 403a to optical fiber 403b and also optically connect optical fiber 403c to optical fiber 403d. The loop back connector arrangements 409 include optical connectors inserted in the outer ports of the adapters 405a-405d and linking fibers that extend between ports 405a and 405b and between ports 405c and 405d. When the drop terminal 104 is ready to be brought into service, the loop back assembly 409 can be removed from the ports of the adapters 405a-405b and connectors corresponding to drop cables can be inserted into the ports. While 4 ports have been shown on the drop terminal 104, it will be appreciated that any number of ports may be used. For example, in one embodiment, drop terminals having 12 ports for accommodating stub cables having 12 fibers can be used. Further details regarding drop terminals can be found at U.S. patent application Ser. Nos. 11/728,043 and 60/978, 638, that are hereby incorporated by reference in their entireties.

A typical FDH includes a cabinet enclosing one or more splitters for splitting signals transmitted to the FDH from an F1 distribution cable. Common splitters used in an FDH include 1×8 splitters, 1×16 splitters and 1×32 splitters. The splitters are each typically housed within a module housing that is mounted within the cabinet of the FDH. An optical fiber from the F1 distribution is optically connected to a splitter within the FDH to provide an input signal to the splitter. The splitter splits the input signal into a plurality of outputs. The outputs typically include fiber optic pigtails having connectorized ends that can be plugged into a first side of a termination field 500 (see FIG. 4) including a plurality of fiber optic adapters 501. Connectors optically connected to fibers of an F2 distribution cable are plugged into a second side of the termination field 500 such that the fiber optic adapters 501 optically connect the outputs from the splitter to the optical fibers of the F2 distribution cable. Further details regarding fiber distribution hubs are provided at U.S. patent application Ser. No. 11/544,951 that is hereby incorporated by reference in its entirety.

Figure 4:
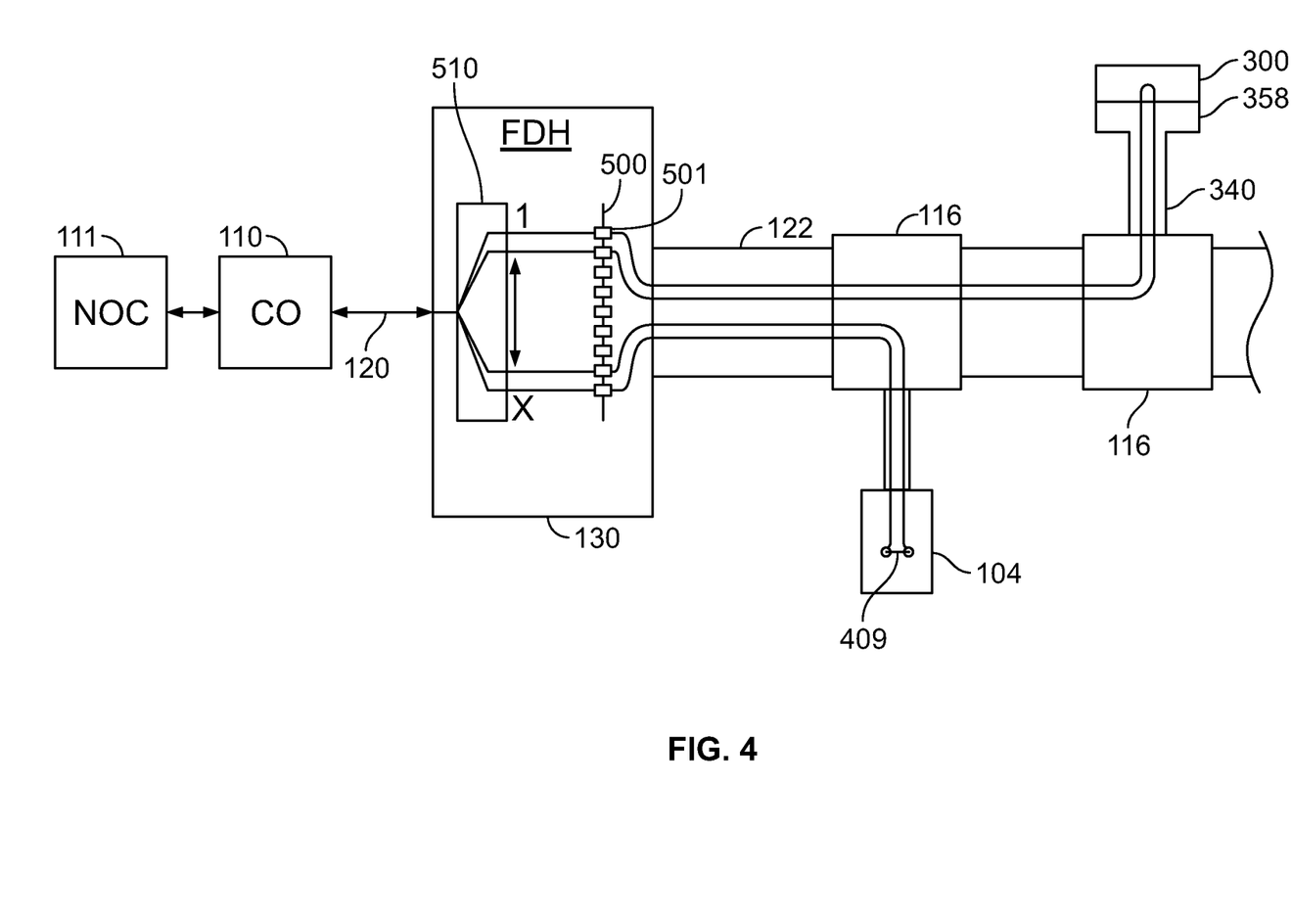
FIG. 4 is a schematic depiction of a system for testing a fiber optic communications network.

Referring to FIGS. 1 and 4, to test fibers that are routed to a pre-connectorized tether with a loop back plug, a test signal can be transmitted from the Network Operation Center 111 to the central office 110. From the central office 110, the signal travels through a F1 distribution cable 120 to the FDH 130. Within the FDH, the signal travels through the splitter 510 and the termination field 500 of the FDH 130 to the F2 distribution cable 122. The F2 distribution cable 122 carries the signal to one of the preconnectorized tethers 340 equipped with one of the loop back plugs 300. At the loop back plug 300, the signal is looped back to another fiber of the tether 340 thereby allowing the signal to travel in a reverse direction back through the tether 340 to the main trunk of the F2 distribution cable 122. The main trunk of the F2 distribution cable 122 carries the signal back to the FDH 130. Within the FDH 130, the signal travels back through the termination field 500 and the splitter 510 to the F1 distribution cable 120. The F1 distribution cable 120 carries the signal back to the central office 110. From the central office 110, the signal is transmitted back to the Network Operation Center 111. Properties of the return signal detected at the NOC 111 provide an indication of the functionality of the optical fibers of the distribution cable being tested.

Referring still to FIGS. 1 and 4, to test fibers that are routed to a drop terminal with a loop back arrangement, a test signal can be transmitted from the Network Operation Center 111 to the central office 110. From the central office 110, the signal travels through the F1 distribution cable 120 to the FDH 130. Within the FDH, the signal travels through the splitter 510 and the termination field 500 to the F2 distribution cable 122. The F2 distribution cable carries the signal to a stub cable that carries the signal to one of the drop terminals 104 with one of the loop back arrangements 409. At the loop back arrangement 409, the signal is looped back to another fiber of the stub cable thereby allowing the signal to travel in a reverse direction back through the stub cable to the main trunk of the F2 distribution cable. The main trunk of the F2 distribution cable 122 carries the signal back to the FDH 130. Within the FDH 130, the signal travels back through the termination field 500 and the splitter 510 to the F1 distribution cable 120. The F1 distribution cable 120 carries the signal back to the central office 110. From the central office 110, the signal is transmitted back to the Network Operation Center 111. Properties of the return signal detected at the NOC provide an indication of the functionality of the optical fibers of the distribution cable being tested.

Use of loop back devices may eliminate shuttling back and forth between different locations of the network when testing is performed. Eliminating shuttling can produce significant time and cost savings when testing deployed distribution cables. An exemplary methods of testing a fiber drop terminal or connectorized tether from a single location are shown in U.S. patent application Ser. Nos. 11/198,848 and 11/406,825, the disclosures of which are hereby incorporated by reference.

Within the FDH, the splitter/splitters provide optical links between the F1 distribution cable and the F2 distribution cable. The optical links provided by the splitters allow signals to pass through the FDH thereby allowing test equipment at the NOC to "see through" the FDH to test the F2 distribution cable network. However, when a network is deployed, it is common to install the full F2 distribution cable network, but to only optically connect a portion of the full F2 network to an F1 distribution cable through the FDH. For example, when the F1 distribution cable is initially installed, only a limited number of subscribers are typically available to receive service. Therefore, to defer cost, the FDH is not fully loaded with enough splitters to provide service to all of the optical lines/ports of the full F2 network. Instead, only enough splitters are provided to serve the needs of the existing subscribers plus a limited additional capacity. As subscribers become available, splitters are added to the FDH to add capacity to match the demand. In the meantime, the portion of the F2 distribution network that is not coupled to a splitter can not be tested from the central office or the NOC. To test these lines, it is necessary to send a technician to the FDH.

Figure 5:
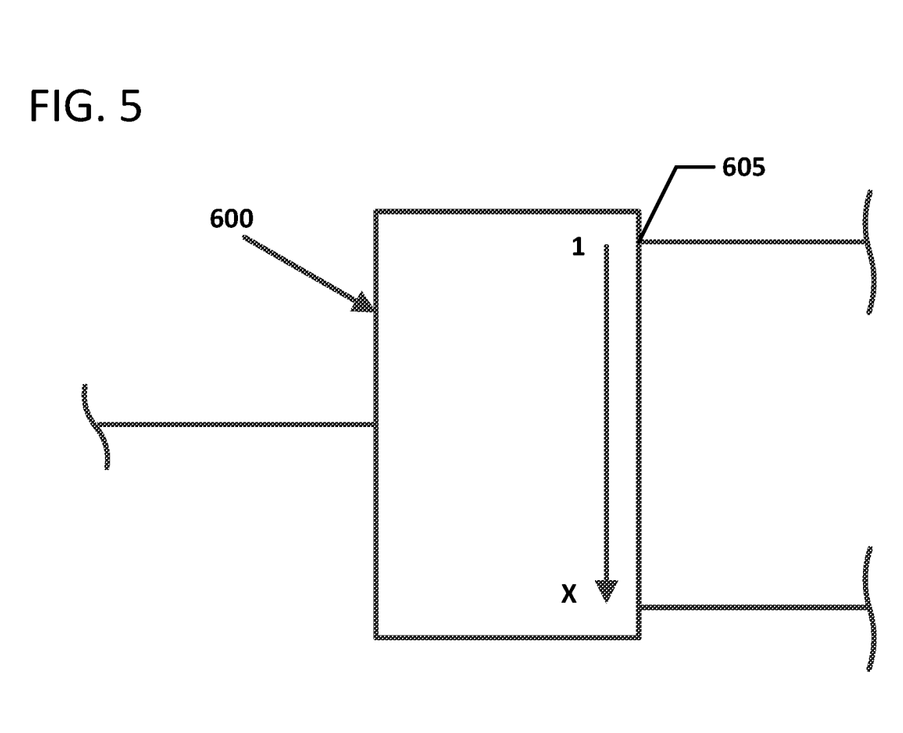
FIG. 5 is a schematic block diagram of a test splitter.

To overcome the above problem, instead of using one or more standard 1×32 splitters during initial deployment of a network, a custom test splitter 600 or splitters can be used that provide optical connections between an F1 distribution cable and all the deployed fibers of an F2 distribution network served by to the FDH. In this way, all of the F2 network served by the FDH could be tested remotely from the NOC of the CO. Example custom test splitters 600 could include splitter modules that provide a splitter ratio greater than 1×32, or greater than or equal to 1×64, or greater than or equal to 1×128, or greater than or equal to 1×256. Other example splitter ratios include 1×144, 1×288 and 1×432. Such splitters would likely introduce higher loss due to the high split ratios, but each splitter 600 could also be lower cost per port/line since it would be integrated into one module. Additionally, in certain embodiments, the return loss of the various ports of the splitter could be "tuned" so that each one had a unique signature detectable at the NOC. For example, each port on the splitter 600 could have a slightly higher loss so that an Optical Time Domain Reflectometer (OTDR) at the NOC could detect easily the different ports. For instance, port 1 may be assigned a 17 dB of loss, port 2 may be assigned a 17.5 dB of loss, port 3 may be assigned a 18 dB of loss, and so on for each of the ports.

In practice, the custom splitter manufacturer/supplier could provide a service provider with one or more custom splitters 600 and factory tested tuned/unique return loss data for each of the ports 605 of the splitters 600. The custom test splitter 600 could be sold to the service provider in combination with an FDH (e.g., the custom test splitter could be pre-loaded in the FDH by the manufacturer/supplier). When the service provider initially installs the FDH in the field, the one or more custom splitters 600 can be used to provide optical connectivity through the FDH to all of the outgoing F2 fibers intended to be served by the FDH. When the installation is complete, the custom splitter/splitters 600 along with the data regarding the factory tested loss for each of the splitter ports 605 can be used by the service provider to remotely test the entire F2 distribution network intended to be served by the FDH. After testing, the custom splitter/ splitters 600 can be removed and replaced with standard splitters that provide enough capacity to serve the subscriber demand at the time. Typically, to defer cost, the FDH would not be fully loaded with splitters at that time. The custom test splitter/splitters 600 removed from the FDH could be sent back to the manufacturer/supplier for credit toward future or current purchases. The manufacturer/supplier could retest the custom test splitter/splitters 600 to ensure they could be used again. If the custom test splitter/splitters 600 performed at an acceptable level, the custom test splitter/splitters 600 could be sold with another FDH.

From the forgoing detailed description, it will be evident that modifications and variations can be made without departing from the spirit and scope of the disclosure.

What is claimed is:

1. An optical splitter assembly comprising:
    a fiber distribution hub;
    a passive optical splitter positioned within the fiber distribution hub; and
    a plurality of splitter output pigtails, each of the plurality of splitter output pigtails including an optical fiber structure having a first end optically coupled to the passive optical splitter and a second end connected to a first side of a termination field, each one of the plurality of splitter output pigtails being tuned so as to have a different and unique test characteristic such that each one of the plurality of splitter output pigtails can be individually identified during optical network testing;
    wherein each of the plurality of splitter output pigtails is tuned to have a predetermined different return loss.

2. The optical splitter assembly of claim 1, wherein the optical network testing is performed using an optical time domain reflectometer.

3. The optical splitter assembly of claim 1, wherein a second side of the termination field is connected to a distribution cable having a pre-connectorized tether connected to u loop-hack device capable of looping back a test signal.

4. The optical splitter assembly of claim 1, wherein a second side of the termination field is connected to a distribution cable connected to a drop terminal at which a loop-back device for looping back a test signal is located.

5. The optical splitter assembly of claim 1, wherein each of the plurality of splitter output pigtails is tuned to have a predetermined unique detectable signature.

\* \* \* \* \*

UNITED STATES PATENT AND TRADEMARK OFFICE
CERTIFICATE OF CORRECTION

PATENT NO. : 10,200,119 B2
APPLICATION NO. : 15/054689
DATED : February 5, 2019
INVENTOR(S) : Trevor D. Smith Page 1 of 1

It is certified that error appears in the above-identified patent and that said Letters Patent is hereby corrected as shown below:

In the Claims

Column 8, Line 14, Claim 3: "to u loop-hack device" should read --to a loop-back device--

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*